(12) United States Patent
Lee et al.

(10) Patent No.: US 8,837,177 B2
(45) Date of Patent: Sep. 16, 2014

(54) ELECTRIC GENERATING SYSTEM USING SOLAR CELL

(75) Inventors: Tae Won Lee, Suwon-si (KR); Yong Hyok Ji, Suwon-si (KR); Young Ho Kim, Seoul (KR); Doo Young Song, Gwangju (KR); Min Ho Heo, Gwangju (KR); Tae Hoon Kim, Suwon-si (KR); Se Ho Lee, Suwon-si (KR); Chung Yuen Won, Gwacheon-si (KR)

(73) Assignees: Samsung Electro-Mechanics Co., Ltd., Gyunggi-Do (KR); Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 207 days.

(21) Appl. No.: 13/413,576

(22) Filed: Mar. 6, 2012

(65) Prior Publication Data

US 2012/0268970 A1    Oct. 25, 2012

(30) Foreign Application Priority Data

Apr. 20, 2011  (KR) .......................... 10-2011-0036964

(51) Int. Cl.

| | | |
|---|---|---|
| *H02M 7/53* | (2006.01) | |
| *H02M 1/32* | (2007.01) | |
| *H02M 7/5387* | (2007.01) | |
| *H02M 7/48* | (2006.01) | |
| *H02M 1/00* | (2006.01) | |
| *H02J 3/38* | (2006.01) | |

(52) U.S. Cl.
CPC ........ *H02M 1/32* (2013.01); *H02M 2001/0067* (2013.01); *H02M 7/53873* (2013.01); *H02M 7/4807* (2013.01); *H02M 2001/0003* (2013.01); *H02J 3/385* (2013.01); *Y02E 10/58* (2013.01); *Y10S 323/906* (2013.01)

USPC ......................................... 363/56.01; 323/906

(58) Field of Classification Search
USPC ........................... 323/906; 363/71, 55, 56.01
See application file for complete search history.

(56) References Cited

U.S. PATENT DOCUMENTS

2006/0250115 A1*  11/2006  Johnson .......................... 322/58

FOREIGN PATENT DOCUMENTS

| JP | 06-230838 | 8/1994 |
|---|---|---|
| JP | 2002-270876 | 9/2002 |
| KR | 10-2010-0065914 A | 6/2010 |

OTHER PUBLICATIONS

Cn 201210118678.0 Office Action dated May 7, 2014; 17pgs.

* cited by examiner

*Primary Examiner* — Harry Behm
*Assistant Examiner* — Matthew Grubb
(74) *Attorney, Agent, or Firm* — Bracewell & Giuliani LLP; Brad Y. Chin

(57) ABSTRACT

An electric generating system using a solar cell improves the quality of output power by including a converter for converting an output voltage generated from the solar cell into DC voltage in a pulse shape. An inverter converts the DC voltage in the pulse shape into an AC voltage and applies the AC voltage to a power system and a control device for determining whether an erroneous operation of the electric generating system using the solar cell is generated or not based on an output voltage of the solar cell, an output current of the solar cell and a voltage of the power system. At least one inverter switching device among a plurality of inverter switching devices performs a switching at a frequency higher than a frequency during a normal operation at an interval where the erroneous operation is generated.

12 Claims, 8 Drawing Sheets voltage of power system(Vgrid)

converter control signal(PWM_sw)

direct voltage outputted from the converter(VDC)

current command value(I out*)

compensation signal(Sc)

high frequency control signal(Sf)

first inverter control signal second inverter control signal third inverter control signal fourth inverter control signal

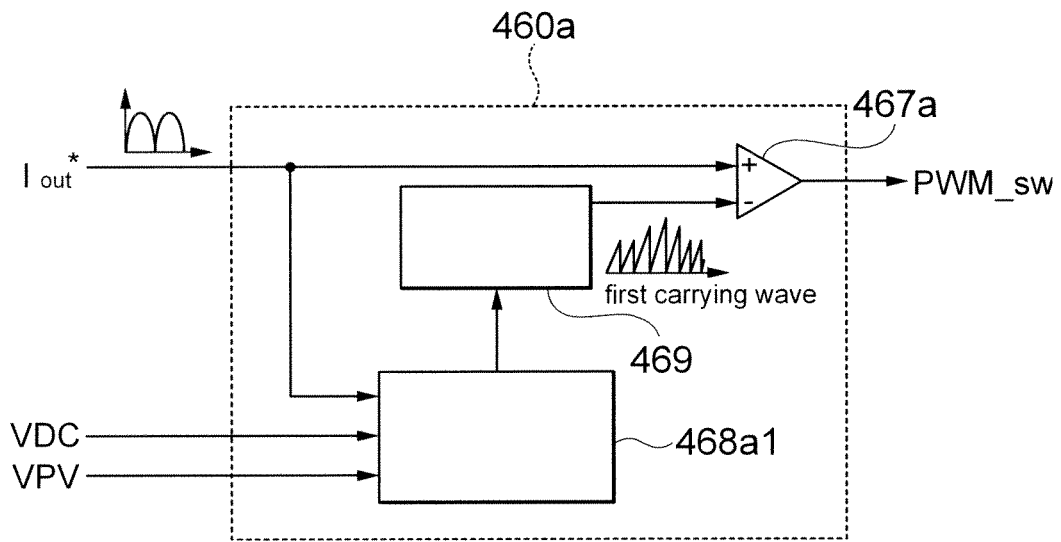

ELECTRIC GENERATING SYSTEM USING SOLAR CELL

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2011-0036964, entitled filed Apr. 20, 2011, which is hereby incorporated by reference in its entirety into this application.

BACKGROUND OF THE INVENTION

1. Field of the Invention

The present invention relates to an electric generating system using a solar cell, and more particularly, to an electric generating system using a solar cell to generate electricity by using sunlight.

2. Description of the Related Art

Recently, according to the increment of power demands, the expansion of power infra is being magnified as a very significant problem. As power loads used a specific season or a specific time is rapidly increased in such power demands, it causes a shortage of constant standby power and becomes a cause of accident generation such as power failure.

According to this, in order to prevent the generation of the above-described problems, there have been various trials such as to secure power infra and to limit the usages, and unlimited clean energy source is one among those and there has been attended to a method using a solar cell having an advantage matched to a domestic semiconductor technology.

On the other hands, the electric generating system using the solar cell is designed in such a way that each solar cell module is coupled to a power system by mounting the power converting devices on the rear surfaces of a plurality of solar cell modules, respectively.

However, although the solar cell modules are a solar cell module capable of generating the same power by a manufacturing feature, since they show various output features different from each other according to a manufacture and a product model, there are problems incapable of transmitting stable power by being deviated from protection and quality regulations to be maintained by a commercial power system.

And also, since the solar cell module has conditions, e.g., a maximum power point, to generate the maximum power point according to an amount of solar radiation and an ambient environment temperature changed, erroneous operations can be generated in the electric generating system using the solar cell according to an amount of solar radiation and an ambient environment temperature, in this result, there occurs a problem capable of deteriorating a power quality of the power system.

Accordingly, although the erroneous operations are generated due to the changes of the output characteristics of the solar cell, there has been proposed a method capable of securing the quality of the output power.

SUMMARY OF THE INVENTION

The present invention has been invented in order to overcome the above-described problems and it is, therefore, an object of the present invention to provide an electric generating system using a solar cell capable of improving quality of output power by determining whether an erroneous operation is generated in the electric generating system using the solar cell or not and allowing some inverter switching devices among a plurality of inverter switching devices to perform a high-frequency switching operation in a period where the erroneous operation.

In accordance with one aspect of the present invention to achieve the object, there is provided an electric generating system using a solar cell including: a converter for converting an output voltage generated from the solar cell into a DC voltage in a pulse shape; an inverter for converting the DC voltage in the pulse shape into an AC voltage and applying the AC voltage to a power system; and a control device for determining whether an erroneous operation of the electric generating system using the solar cell is generated or not based on an output voltage of the solar cell, an output current of the solar cell and a voltage of the power system and for controlling in such a way that at least one inverter switching device among a plurality of inverter switching devices performs a switching at a frequency higher than a frequency during a normal operation at an interval where the erroneous operation is generated.

Herein, the inverter includes: a first inverter switching device; a second inverter switching device of which a drain is connected to a source of the first inverter switching device; a third inverter switching device of which a drain is connected to a drain of the first inverter switching device; and a fourth inverter switching device of which a source is connected to the source of the second inverter switching device and a drain is connected to a source of the third inverter switching device, wherein the first and the fourth inverter switching devices are turned on in a period where the voltage of the power system is positive and the second and the third inverter switching devices are turned on in a period where the voltage of the power system is negative.

And also, the control device controls in such a way that at least one inverter switching device between the first and the fourth inverter switching devices performs a switching at a frequency higher than a frequency during a normal operation if an erroneous operation is generated at an interval where the voltage of the power system is positive.

And, the control device controls in such a way that at least one inverter switching device between the second and the third inverter switching devices performs a switching at a frequency higher than a frequency during a normal operation if an erroneous operation is generated at an interval where the voltage of the power system is negative.

Meanwhile, the control device includes: a converter control unit for determining whether an erroneous operation is generated in the electric generating system using the solar cell and generating a compensation signal for compensating an inverter control signal to control the inverter switching devices according to the generation result of the erroneous operation; and an inverter control unit for controlling in such a way that at least one inverter switching device among a plurality of inverter switching devices performs a switching at a frequency higher than a frequency during a normal operation at an interval where the erroneous operation is generated by using the compensation signal and a commercial frequency signal of the power system.

At this time, the converter control unit includes: a comparator for comparing a first reference signal with a current command value to control a converter switching device and outputting a converter control signal as the comparison result; and a compensator for calculating a threshold value by using an output voltage of the solar cell, conduction rate information of the converter switching device and the DC voltage, determining whether the erroneous operation is generated or not by using a result obtained by comparing the calculated threshold value with the current command value and outputting by varying the compensation signal according to the erroneous operation generation state.

At this time, the converter control unit includes: a comparator for comparing a first reference signal with a current command value to control a converter switching device and outputting a converter control signal as the comparison result; and a compensator for calculating a threshold value by using an output voltage of the solar cell, conduction rate information of the converter switching device and the DC voltage, determining whether the erroneous operation is generated or not by using a result obtained by comparing the calculated threshold value with the current command value and outputting by varying the compensation signal according to the erroneous operation generation state.

The compensator determines as a normal operation if the current command value is smaller than the threshold value and determines as an erroneous operation if the current command value is not smaller than the threshold value.

That is, the compensator determines as an erroneous operation if a condition of a below equation 1 is satisfied; and, if the condition of the below equation 1 is not satisfied, determines as a normal operation, $$I_{out}^* \geq \frac{V_{DC} D_u}{n V_{PV} + V_{DC}}$$

wherein the Du is a maximum value of the first reference signal, the n is a winding ratio of a transformer T, the $V_{DC}$ is a DC voltage, the VPV is an output voltage generated in the solar cell and the $I_{OUT}^*$ is a current command value.

And, the inverter control unit includes: a high frequency signal generating unit for comparing a predetermined second reference signal with the compensation signal to output a high frequency control signal as the compared result; a commercial frequency signal generating unit for outputting a commercial frequency signal synchronized with a phase of the power system; and an inverter signal generating unit for generating a plurality of inverter control signals by using the high frequency control signal and the commercial frequency signal.

In addition, the compensator includes: an erroneous operation determining unit for comparing the current command value with the calculated threshold value and for determining whether an erroneous operation is generated or not by using the comparison result; and a compensation signal generating unit for outputting a maximum value of the second reference signal as the compensation signal if the erroneous operation determining unit determines as a normal operation.

In addition, the compensator includes: an erroneous determining unit for comparing the current command value with the calculated threshold value to determine whether an erroneous operation is generated or not by using the comparison result; an output constant estimating unit for estimating an output constant with reference to an amount of power to be generated if the erroneous determining unit determines as an erroneous operation; a compensation coefficient calculating unit for calculating a compensation coefficient based on the output constant; and a compensation signal generating unit for generating the compensation signal by using the compensation coefficient, the maximum values of the first and the second reference signals and the current command value.

And also, the inverter signal generating unit applies the inverter control signal generated by multiplying the high frequency control signal by the commercial frequency signal to at least one inverter switching device among the plurality of inverter switching devices in an interval where the erroneous operation is generated and the inverter signal generating unit applies the commercial frequency signal to the remaining switching devices among the plurality of inverter switching devices.

At this time, at least one inverter switching device among the plurality of inverter switching devices is constituted of an active switching device.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 10 is a detailed construction view of a converter signal generating unit in accordance with still another embodiment of the present invention.

DETAILED DESCRIPTION OF THE PREFERABLE EMBODIMENTS

Hereinafter, specific embodiments of the present invention will be described with reference to the accompanying drawings. However, the following embodiments are provided as examples but are not intended to limit the present invention thereto.

Descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

The technical sprit of the present invention should be defined by the appended claims, and the following embodiments are merely examples for efficiently describing the technical spirit of the present invention to those skilled in the art.

Hereinafter, the present invention will be explained in detail with reference to the accompanying drawings as follows.

Figure 1:
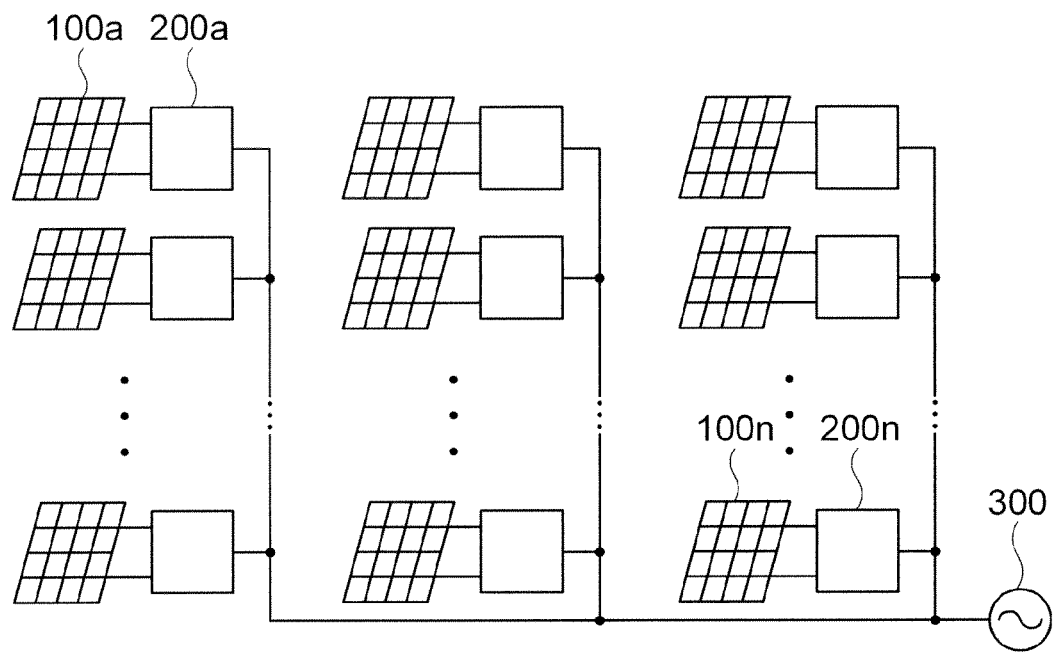
FIG. 1 is an overall construction view of an electric generating system using a solar cell in accordance with an embodiment of the present invention.

FIG. 1 is an overall construction view of an electric generating system using a solar cell in accordance with an embodiment of the present invention.

As shown in FIG. 1, the electric generating system 1 includes the solar cell 100 (100a~100n), a power converting device 200 (200a~200n) for converting power generated in the solar cell 100 to apply the converted power to a power system 300 (Grid) and the power system 300.

Herein, the solar cell 100 generates effective PV power due to the solar generation by performing the solar generation at the time when the solar light exists by classifying into a time such as when the solar light exists and a time such as night when the solar light does not exist; and does not generate an effective PV power in case when the power generation is not performed.

Like this, the solar cell 100 can be controlled so as to generate the maximum power through an MPPT(Maximum Power Point Tracking) to track the maximum power point among power generated due to the solar cell 100 since it cannot uniformly perform the solar generation according to the state of solar light.

Figure 2:
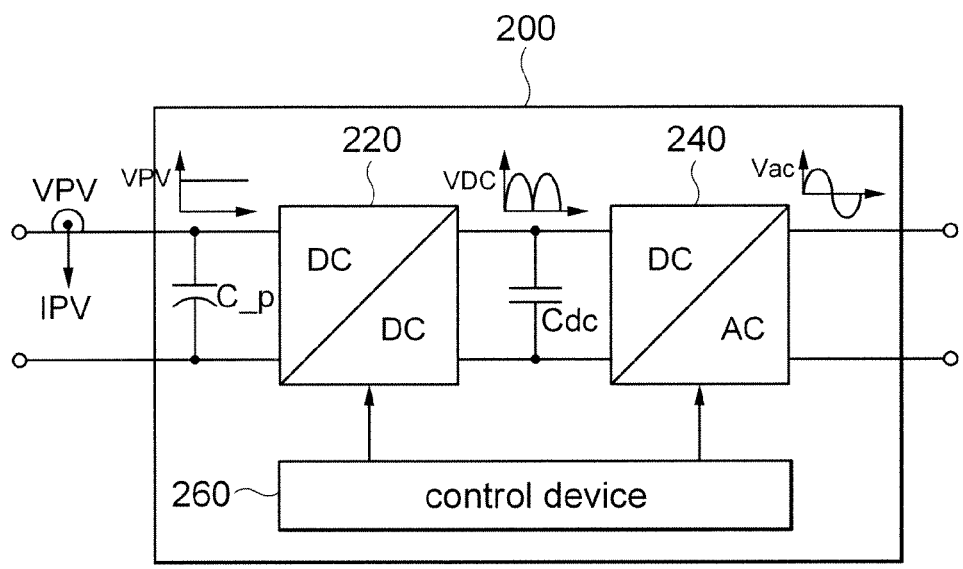
FIG. 2 is a construction view of a power converting device shown in FIG. 1.

FIG. 2 is a construction view of a power converting device shown in FIG. 1.

Referring to FIG. 2, the power converting device 200 includes a DC/DC converting device 220(hereinafter, referring to as a converter) to convert the output voltage generated in the solar cell 100, a DC/AC converting device 240(hereinafter, referring to as an inverter) to convert the direct voltage VDC in a pulse shape into an alternative voltage(Vac) to apply the converted voltage to the power system 300 and a control device 260 to control the operations of the converter 220 and the inverter 240 based on an output voltage VPV of the solar cell 100, an output current IPV of the solar cell 100 and the voltage Vgrid of the power system.

As the converter 220 is a means to convert the output voltage VPV generated in the solar cell into the direct voltage VDC in a shape of an electromagnetic wave rectified sawtooth wave, the direct voltage (VDC) may have a frequency approximately double of the power system 300.

Since such converter 220 may be a fly-back converter, a buck-boost converter, a push-pull converter, a half-bridge converter, a full-bridge converter or the like, as well as it can also use a converter modified based on the converter.

Figure 3:
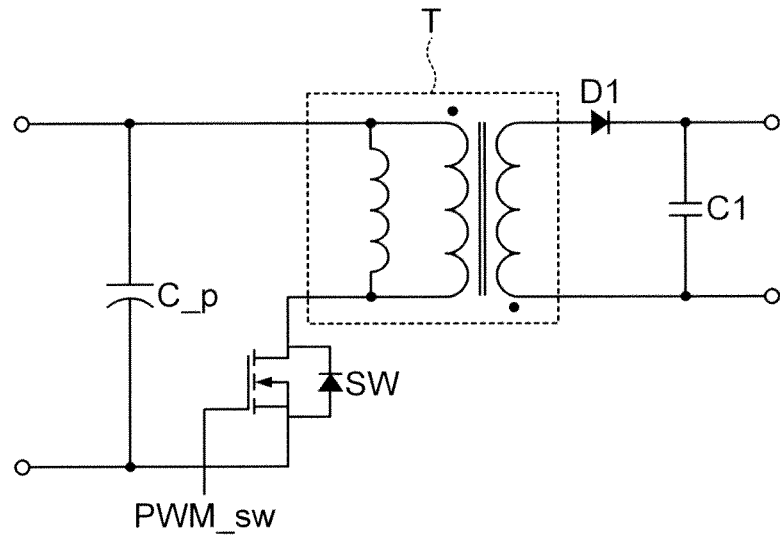
FIG. 3 is an inner circuit diagram of an inverter shown in FIG. 2.

As FIG. 3 is an inner circuit diagram of an inverter shown in FIG. 2, in the embodiment of the present invention, the fly-back converter can be explained as an example.

Referring to FIG. 3, reviewing an operation process of the converter 230 in brief, if a converter control signal $PWM\_{SW}$ outputted in the control device 260 to a converter switching device SW, the voltage charged on a power capacitor C_p according to the PWM (Pulse Width Modulation) control operation of the converter control signal $PWM\_{SW}$ is induced from a primary coil to a secondary coil of the transformer T. And, the induced voltage can be outputted as a direct voltage VDC through an output diode D1 and an output capacitor C1.

Referring back to FIG. 2, as the inverter 240 is a means to convert a direct voltage VDC in a pulse shape outputted from the converter 220 into an alternative voltage Vac synchronized with the power system 300 to apply the converted alternative voltage Vac to the power system, it is constituted of a plurality of inverter switching devices Q1~Qn to perform a switching operation according to a plurality of inverter control signals PWM_q1~PWM_qn outputted from the control device 260.

FIGS. 4a to 4d are an inner circuit diagram of an inverter shown in FIG. 2.

Referring to FIGS. 4a to 4d, in the embodiment of the present invention, four inverter switching devices Q1, Q2, Q3 and Q4 are explained as an example, and it is characterized in that the four inverter switching devices Q1, Q2, Q3 and Q4 are implemented in a shape of H-bridge.

More particularly, the inverter 240 includes a first inverter switching device Q1, a second inverter switching device Q2 of which a drain is connected to a source of the first inverter switching device Q1, a third inverter switching device Q3 of which a drain is connected to a drain of the first inverter switching device Q1, and a fourth inverter switching device Q4 of which a source is connected to a source of the second inverter switching device Q2 and a drain is connected to a source of the third inverter switching device Q3.

In the inverter 240 in the H-bridge shape, the first and the fourth inverter switching devices Q1 and Q4 turn on in an interval where the voltage of the power system 300 is positive and the second and the third inverter switching devices Q2 and Q3 turn off. And the second and the third inverter switching devices Q2 and Q3 turn on in an interval where the voltage of the power system 300 is negative and the first and the fourth inverter switching devices Q1 and Q4 turn off.

Figure 4A:
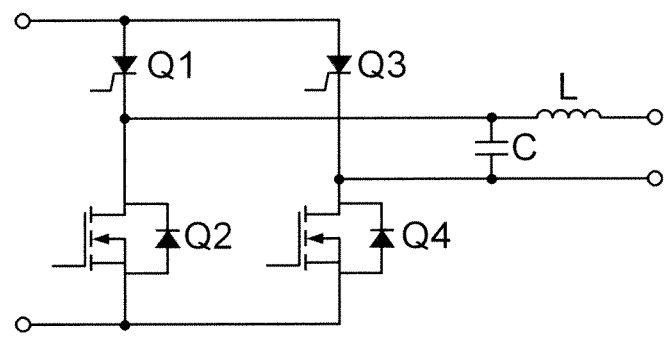
FIGS. 4a to 4d are an inner circuit diagram of an inverter shown in FIG. 2.
Figure 4B:
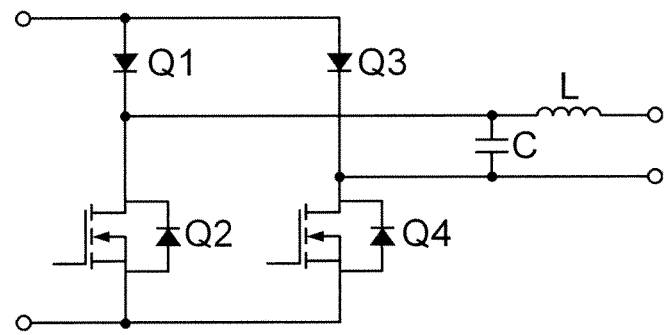

At this time, the inverters 240 of FIG. 4a to FIG. 4b must be designed in such a way that at least one inverter switching device among the first to the fourth inverter switching devices Q1 to Q4 must be an active switching device (MOSFET, IGBT, BJT) capable of performing a blocking control.

The reasons for constructing the active switching device with at least one number are that a reset operation can be performed by only a switching control signal without an additional reset circuit and a blocking control of the switching device is easy, thereby improving the quality of output power by using this.

Figure 4C:
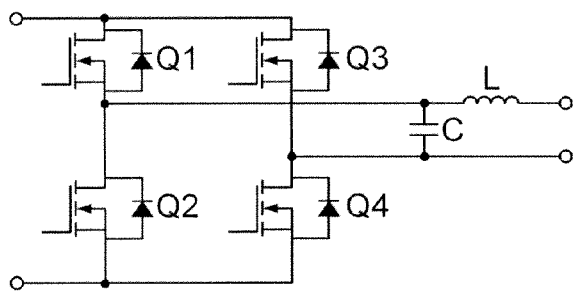
Figure 4D:
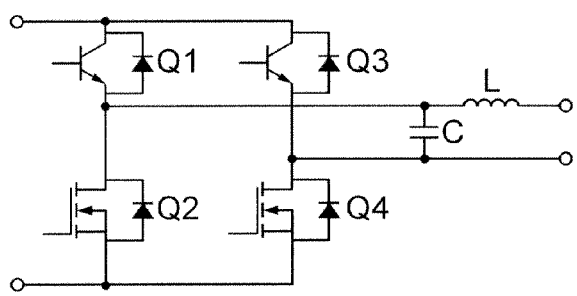

In accordance with the embodiments of the present invention, the embodiment of FIG. 4c, in which all of the first to the fourth inverter switching devices Q1~Q4 are active switching devices, is explained as an example.

Figure 5:
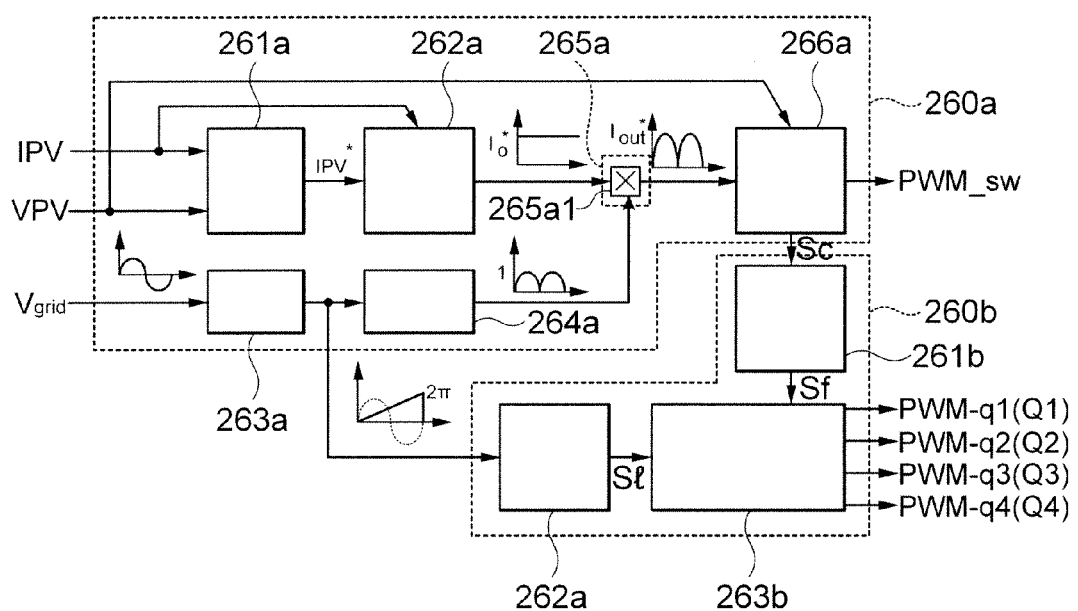
FIG. 5 is a construction view of a control device shown in FIG. 2.
Figure 6:
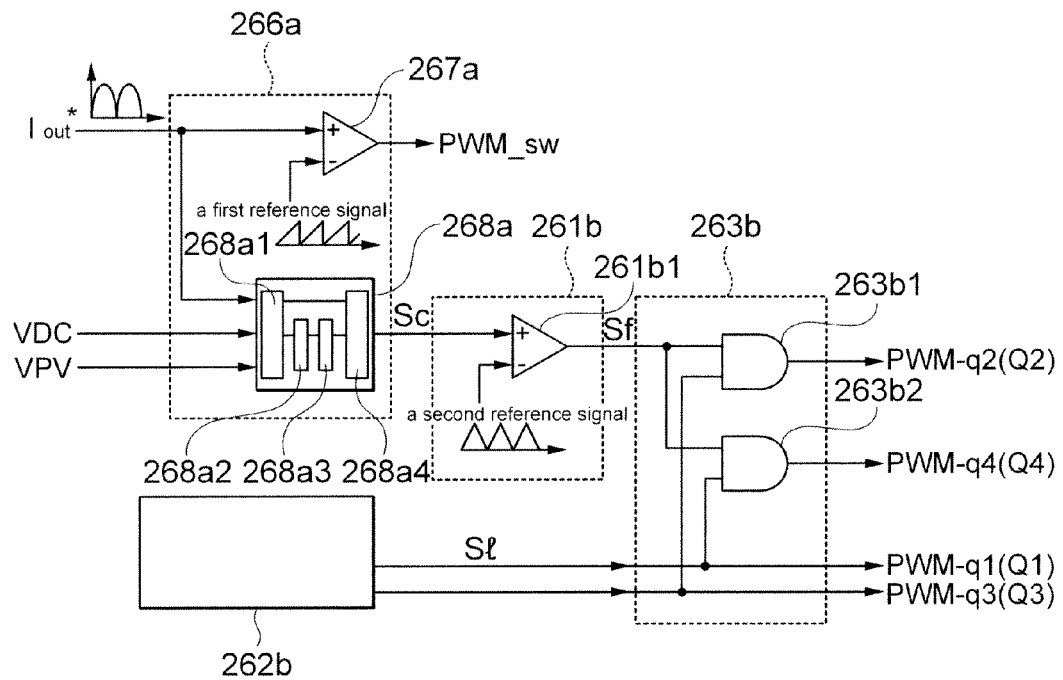
FIG. 6 is a detailed construction view of a part of the control device shown in FIG. 2.

FIG. 5 is a construction view of a control device shown in FIG. 2; and FIG. 6 is a detailed construction view of a part of the control device shown in FIG. 2.

Referring to FIG. 5, the control device 260 includes a converter control unit 260a to generate a converter control signal $PWM\_{SW}$ and output it to the converter 220 for converting the output voltage VPV generated in the solar cell 100 into a direct voltage VDC of the same phase and an inverter control unit 260b to generate a plurality of inverter control signals PWM_q1~PWM_q4) to output them to the inverter 240 for converting the direct voltage VDC outputted in the converter 220 into the alternative voltage Vac.

At this time, the converter control unit 260a determines whether an erroneous operation is generated in the electric generating system 1 or not, besides a role of generating and outputting the converter control signal PWM_SW, and performs an operation to improve the quality of power outputted from the electric generating system 1 by varying the switching operation of the inverter switching devices Q1~Q4 according to the generation state of the erroneous operation.

In order to this, the converter control unit 260a plays a role of generating a compensation signal Sc for compensating the plurality of inverter control signals PWM_q1~PWM_q4 to control the plurality of inverter switching devices Q1~Q4 to transmit it to the inverter control unit 260b.

More explaining the above-described converter control unit 260a in detail, the converter control unit 260a includes an MPPT control unit 261a, a current control unit 262a, a phase detection unit 263a, a sine value calculation unit 264a, a calculation unit 265a and a converter signal generating unit 266a.

The MPPT control unit 261a generates a reference current IPV* by performing an MPPT (Maximum Power Point Tracking) control based on the output voltage VPN and the output current IPV information of the solar cell 100 to maintain the power conversion and the maximum output of the inverter 240 and to transmit it to the current control unit 262a.

The current control unit 262a calculates a direct current command value Io* according to a difference value between the output current IPV and the reference current IPV* of the solar cell 100 to output the calculated value.

The phase detecting unit 263a detects a phase angle of the power system 300, the sine value calculation unit 264a calculates a frequency difference amplification value by amplifying the difference between a preset constant reference frequency and an output frequency of the inverter 240 to a predetermined gain, and outputs a sine SINE value by adding the calculated frequency amplification value to the phase angle of the power system 300 detected from the phase detection unit 263.

The calculation unit 265a, constituted of a multiplexer 265a1, outputs the current command value Iout* by multiplying the sine value outputted from the sine value calculation unit 264a by the direct current command value Io* outputted by the current control unit 262a.

Referring to FIG. 6, the converter signal generating unit 266a includes a comparator 267a and a compensator 268a.

The comparator 267a, by comparing a first reference signal, i.e., a first carrier wave, of a predetermined triangle waveform with a current command value Iout* outputted in the calculation unit 265a, for example, if the current command value Iout* is higher than the first reference signal, outputs a converter control signal PWM$_{\_SW}$ in a high level, vice versa, if the current command value Iout* is not higher than the first reference signal, outputs a converter control signal PWM$_{\_SW}$ in a low level. That is, the comparator 267a generates the converter control signal PWM$_{\_SW}$ varying a pulse width according to a size level of the current command value Iout*.

A compensator 268a determines whether an erroneous operation is generated in the electric generating system 1 including the solar cell 100 or not, and includes an erroneous operation determining unit 268a1, an output power estimating unit 268a2, a compensating coefficient calculator 268a3 and a compensating signal generator 268a4 as a means for generating and outputting compensating signals Sc differently according to the generation state of the erroneous operations.

The erroneous operation determining unit 268a1, as the mean for determining the generation state of the erroneous operation of the electric generating system 1, determines whether the erroneous operations are generated or not by using a conduction rate, i.e., a duty rate, information of a converter switching device SW, an output voltage VPN and a direct voltage VDC of the solar cell 100 and a current command value Iout* outputted from the calculation unit 265a.

Explaining more particularly, the erroneous operation determining unit 268a1, by comparing the current command value Iout* outputted in the calculation unit 265a with a threshold value calculate based on the conduction rate, i.e., a duty rate, information of a converter switching device SW and an output voltage VPN and a direct voltage VDC of the solar cell 100, if the current command value Iout* is lower than the threshold value, determines as a normal operation, whereas if the current command value Iout* is not lower than the threshold value, determines as an erroneous operation.

Being represented by a mathematical equation, it is equal to the following equation 1, if the conditions of the equation 1 are satisfied, e.g., the current command value Iout* is not smaller than the threshold value, it is determined as an erroneous operation, whereas if the conditions of the equation 1 are not satisfied, e.g., the current command value Iout* is smaller than the threshold value, it is determined as a normal operation.

$$I_{out}^* \geq \frac{V_{DC}D_u}{nV_{PV}+V_{DC}} \qquad \text{Equation 1}$$

Wherein the Du is the maximum value of a first reference signal and the n is a winding ratio of a transformer T.

If the erroneous operation is generated in the erroneous operation determining unit 268a1, the compensation signal Sc outputted from the compensator 268a is determined by the output power estimating unit 268a2 and the compensating coefficient calculator 268a3.

The output power estimating unit 268a2 estimates an output constant $P_G$ with reference to an amount of power to be generated currently, wherein the output constant $P_G$ is estimated by using the following equation 2.

$$P_G = \frac{(V_{PV}D_{pk})^2}{2(1-\omega^2 L_f C_f)L_m f_s V_G}. \qquad \text{Equation 2}$$

Wherein the $D_{PK}$ is a duty ratio maximum value of the converter switching device, the VG is a maximum value of the power system voltage, the fs is a switching frequency, the Lm is a magnetization inductance, the Lf is an output filter inductance and the Cf is an output filter capacitance The compensating coefficient calculator 268a3 calculates a compensation coefficient Km based on the output constant $P_G$, wherein the compensation coefficient Km is calculated by using the following equation 3.

$$K_m = \frac{N_p}{\sqrt{2}\,N_s}\sqrt{\frac{(\omega L f I_G + V_G)}{L_m f_s I_G}} \qquad \text{Equation 3}$$

Wherein the IG is a maximum value of the power system current, the VG is a maximum value of the power system voltage, the fs is a switching frequency, and the Np and the Ns are the winding ratios of the primary and the secondary coils of the transformer.

At this time, since the compensation coefficient Km determines a slope of the compensation signal Sc to compensate the output current distorted by the erroneous operation, it can be available that a stable system operation is performed.

And the compensating signal generator 268a4 generates the compensation signal Sc by using the compensation coefficient Km, the maximum values Du and Au of the first and the second reference signals and the current command value Iout*, more particularly, it can be generated by using the following equation 4.

$$S_c = K_m A_u (D_u - I_{out}^*) \qquad \text{Equation 4}$$

Meanwhile, if it is determined as the normal operation in the erroneous operation determining unit 268a1, the compensating signal generator 268a4 outputs the maximum value Au of the second reference signal used in a high frequency signal generating unit 261b to be explained hereinafter. Accordingly, the compensating signal generator 268a4 outputs the compensation signal Sc in a high level.

The inverter control unit 260b includes the high frequency signal generating unit 261b, a commercial frequency signal generating unit 262b and an inverter signal generating unit 263b.

The high frequency signal generating unit 261b by comparing a second reference signal, i.e., a second carrier wave, of a predetermined triangle waveform with a compensation signal Sc outputted in the compensator 268a of the converter signal generating unit 266a by being formed with a comparator 261b1, for example, if the compensation signal Sc is higher than the second reference signal, outputs a high frequency control signal Sf in a high level, vice versa, if the compensation signal Sc is not higher than the second reference signal, outputs a high frequency control signal Sf in a low level.

The commercial frequency signal generating unit 262b outputs a commercial frequency signal S1 synchronized with a phase angle of the power system 300 detected in the phase detecting unit 263a.

The inverter signal generating unit 263b, as a means for generating the first to the fourth inverter control signals PWM_q1~PWM_q4 to control the first to the fourth inverter switching devices Q1~Q4, if an erroneous operation is generated in a period for which the voltage of the power system 300 is positive, controls in such a way that at least one inverter switching device among control the first to the fourth inverter switching devices Q1~Q4 is switched at a frequency higher than a frequency of a normal operation in a period for which the erroneous operation is generated.

And, if the erroneous operation is generated in a period for which the voltage of the power system 300 is negative, at least one inverter switching device among control the second and the third inverter switching devices Q2 and Q3 is switched at a frequency higher than a frequency of a normal operation in a period for which the erroneous operation is generated.

Here, the meaning that the inverter switch operates normally is to switch for a commercial frequency, e.g., 60 Hz, and the meaning that the inverter switch operates at a frequency higher than the frequency, e.g., 60 Hz, of the normal operation is to switch for a frequency above several kHz. That is, it means that the inverter switching device performs a PWM control operation.

Referring to FIG. 3c and FIG. 6, the inverter signal generating unit 263b applies the first and the fourth inverter control signals PWM_q1 and PWM_q4 for PWM operating the first and the fourth inverter switching devices Q1 and Q4 in a period for which the voltage of the power system 300 is positive, wherein, if the erroneous operation is generated, the high frequency control signal Sf is multiplied by the commercial frequency signal S1 using the multiplier 263b2 in the period for which the erroneous operation is generated to applied the multiplied value to the fourth inverter switching device Q4 and applies the commercial frequency signal S1 to the first inverter switching device Q1 as it is.

And also, the inverter signal generating unit 263b applies the second and the third inverter control signals PWM_q2 and PWM_q3 for PWM operating the second and the third inverter switching devices Q2 and Q3 in a period for which the voltage of the power system 300 is negative, wherein, if the erroneous operation is generated, the multiplier 263b2 multiplies the high frequency control signal Sf by the commercial frequency signal S1 in the period for which the erroneous operation is generated to applied the multiplied value to the second inverter switching device Q2 and applies the commercial frequency signal S1 to the third inverter switching device Q3 as it is.

Figure 7A:
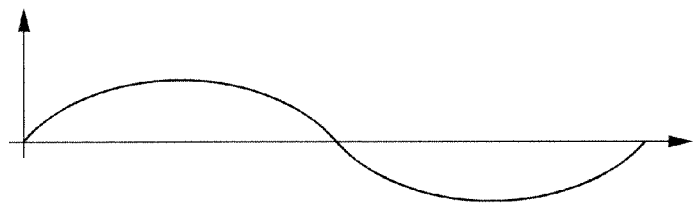
FIG. 7 is a graph showing signals outputted from the control device shown in FIG. 5.
Figure 7B:
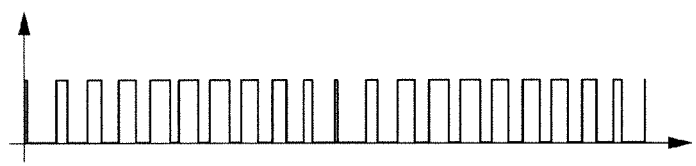
Figure 7C:
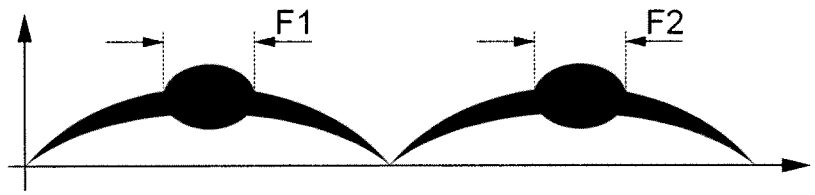
Figure 7D:
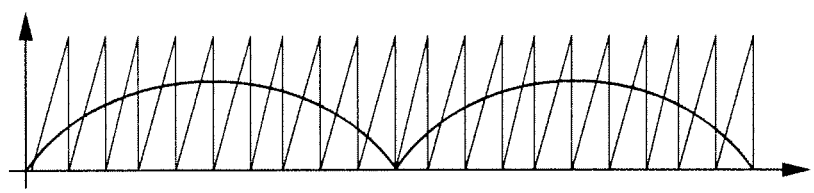
Figure 7E:
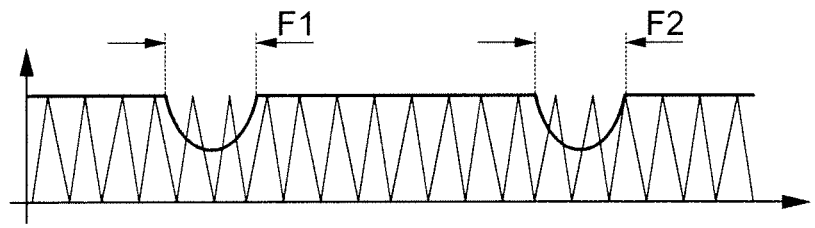
Figure 7F:
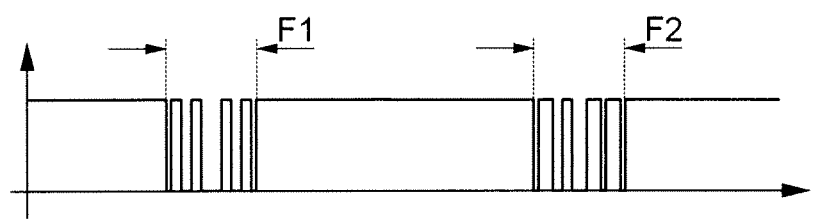
Figure 7G:
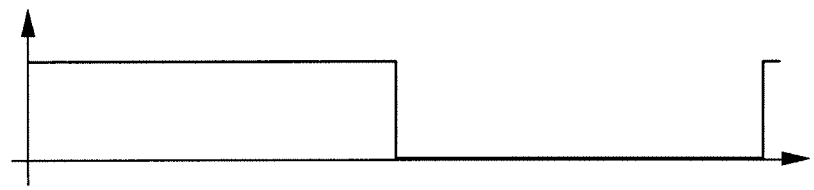
Figure 7H:
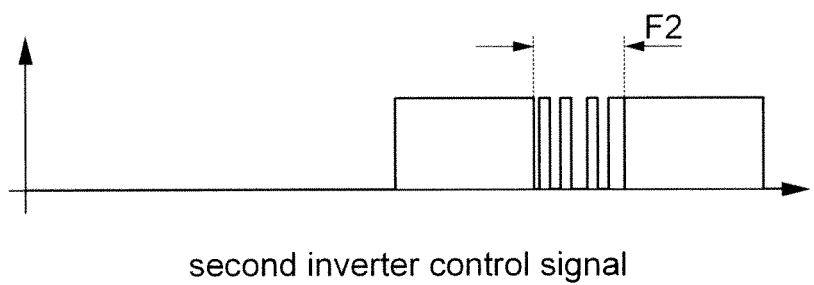
Figure 7I:
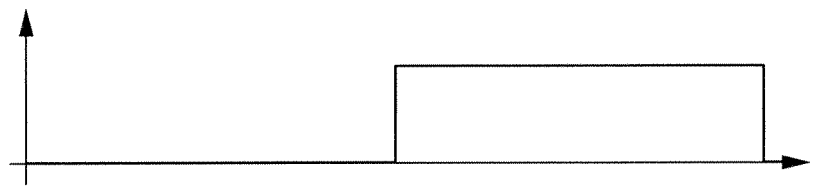
Figure 7J:
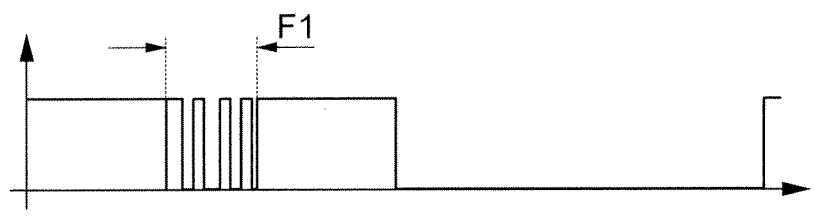

FIG. 7a and FIG. 7j are graphs showing signals outputted from the control device shown in FIG. 5.

In the solar cell 100, the erroneous operation is generated in the electric generating system 1 according to the amount of solar radiation and the ambient environment temperature, the converter 220 distorts the direct voltage VDC to output as similar to the periods F1 and F2 in FIG. 7C.

And then, the control device 260 detects the period to generate the erroneous operation and controls in such a way that the distorted voltage is corrected by allowing at least one inverter switching device among the plurality of inverter switching devices Q1~Q4 to operate the high frequency switching in the periods F1 and F2 to generate the erroneous operations.

Describing the technology to correct the distorted voltage in detail, the calculation unit 265a of the converter control unit 260a outputs the current command value Iout* similar to FIG. 7d, the compensator 268 a generates and outputs the correction signal Sc similar to FIG. 7e through the above-described correction process. And then, the high frequency signal generating unit 261b compares the correction signal Sc with the second reference signal to output the high frequency control signal Sf similar to FIG. 7f as the compared result.

Thereafter, in the period for which the voltage of the power system 300 is positive similar to FIG. 7g to FIG. 7j, the first and the fourth inverter switching devices Q1 and Q4 are turned on, in the period F1 for which the erroneous operation is generated, the fourth inverter switching device Q4 performs the high frequency switching by outputting the fourth inverter control signal PWM_q4 similar to FIG. 7j.

Also, in the period for which the voltage of the power system 300 is negative, the second and the third inverter switching devices Q2 and Q3 are turned on, in the period F2 for which the erroneous operation is generated, the second inverter switching device Q2 performs the high frequency switching by outputting the second inverter control signal PWM_q2 similar to FIG. 7h.

On the other hands, as shown in FIG. 7g to FIG. 7j, the first and the fourth inverter switching devices Q1 and Q4 are turned on in the period for which the voltage of the power system 300 is positive, although it is explained that, in the period F1 to generate the erroneous operation, only the fourth inverter switching device Q4 performs a high frequency switching operation, it can be available that the first and the fourth inverter switching devices Q1 and Q4 perform the high frequency switching operations at the same time in the period F1 to generate the erroneous operation and it can be also available that the second and the third inverter switching devices Q2 and Q3 perform the high frequency switching operations at the same time in the period F2 to generate the erroneous operation during a period for which the voltage of the power system 300 is negative.

Figure 8:
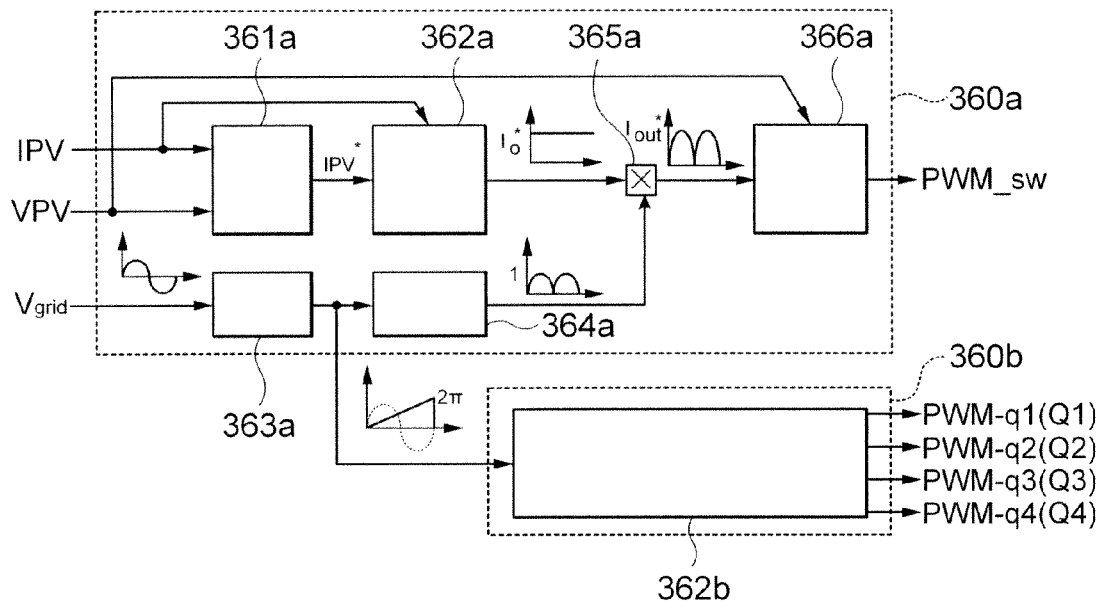
FIG. 8 is a construction view of a control device in accordance with another embodiment of the present invention.
Figure 9:
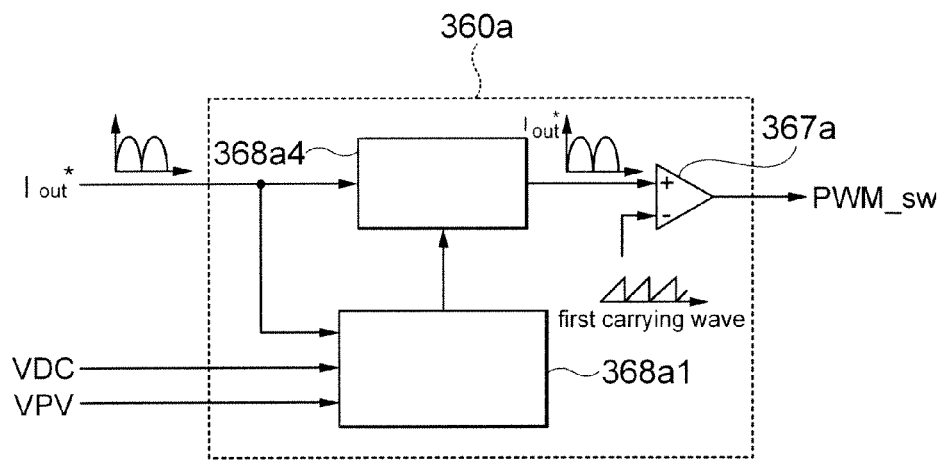
FIG. 9 is a detailed construction view of a converter signal generating unit in accordance with still another embodiment of the present invention.

FIG. 8 is a construction view of a control device in accordance with another embodiment of the present invention; and FIG. 9 is a detailed construction view of a converter signal generating unit in accordance with still another embodiment of the present invention.

As shown in FIG. 8 and FIG. 9, the control device in accordance with another embodiment of the present invention can be applied to a case that an active switching device is not used as the inverter switching devices Q1~Q4 as a method to further expand a switching control technique in accordance with one embodiment of the present invention.

Hereinafter, the explanation for the constructions having the same function will be omitted since it is explained in the embodiment of the present invention.

The converter signal generating unit 360a includes an erroneous determining unit 368a1 and a compensation signal generating unit 368a4.

If the erroneous determining unit 368a1 determines that the erroneous operation is generated by satisfying the equation 1 in accordance with the embodiment of the present invention, a control signal is transmitted to the compensation signal generating unit 368a4 and the compensation signal generating unit 368a4 limits the increment of duty ratio of the converter switching device SW by restricting a current command value Iout* based on the control signal.

As FIG. 10 is a detailed construction view of a converter signal generating unit in accordance with still another embodiment of the present invention, the still another embodiment of the present invention is that the control signal outputted in an erroneous determining unit 468a1 changes a frequency of a first reference signal, i.e., a first carrier wave.

As shown in FIG. 10, if the erroneous determining unit 468a1 determines that the erroneous operation is generated by satisfying the equation 1 in accordance with the embodiment of the present invention, a control signal is transmitted to a first carrier wave generating unit 469 and a comparator 467a outputs a converter control signal $PWM\_{SW}$ as a result obtained by comparing a current command value Iout* with the first carrier wave by allowing the first carrier wave generating unit 469 to change a frequency of the first carrier wave.

The converter control signal PWM_SW outputted like this can prevent the power converting device from being lost due to the erroneous operation together with a quality compensation effect of the output power by lowering the switching frequency.

As described above, according to the electric generating system using the solar cell in accordance with the embodiment of the present invention, it has advantages that the distortion of the current outputted in the converter is determined by generating the erroneous operations in the electric generating system using the solar cell and the quality of the output power can be secured by improving the switching method by high frequency switching a portion of inverter switching devices among the plurality of inverter switching devices.

And also, it can be easily improve the quality of the output power of the electric generating system using the solar cell without an additional detector, or sensor, as well as, it has an advantage to save a manufacturing cost thereof since the cost for purchasing the additional detector or sensor is not needed.

In addition, since the range of the input voltage is automatically expanded, it has an advantage to be variously applied to the solar cell modules having the same rectified output power.

And, although the erroneous operation is generated, since the electric generating system using the solar cell is operated in the safe operation region, it has an advantage to minimize the loss in view of the solar energy use.

While the invention has been described in detail with reference to preferred embodiments thereof, it will be appreciated by those skilled in the art that changes may be made in these embodiments without departing from the scope of the invention.

What is claimed is:

1. An electric generating system using a solar cell comprising:
    a converter for converting an output voltage generated from the solar cell into a DC voltage in a pulse shape;
    an inverter for converting the DC voltage in the pulse shape into an AC voltage and applying the AC voltage to a power system; and
    a control device for determining whether an erroneous operation of the electric generating system using the solar cell is generated or not based on an output voltage of the solar cell, an output current of the solar cell and a voltage of the power system and for controlling in such a way that at least one inverter switching device among a plurality of inverter switching devices performs a switching at a frequency higher than a frequency during a normal operation at an interval where the erroneous operation is generated,
    wherein the control device includes:
        a converter control unit for determining whether an erroneous operation is generated in the electric generating system using the solar cell and generating a compensation signal for compensating an inverter control signal to control the inverter switching devices according to the generation result of the erroneous operation, and
        an inverter control unit for controlling in such a way that at least one inverter switching device among the plurality of inverter switching devices performs a switching at a frequency higher than a frequency during a normal operation at an interval where the erroneous operation is generated by using the compensation signal and a commercial frequency signal of the power system,
    wherein the converter control unit includes:
        a comparator for comparing a first reference signal with a current command value to control a converter switching device and outputting a converter control signal as a comparison result, and
        a compensator for calculating a threshold value by using an output voltage of the solar cell, conduction rate information of the converter switching device and the DC voltage, determining whether the erroneous operation is generated or not by using a result obtained by comparing the calculated threshold value with the current command value and outputting by varying the compensation signal according to the erroneous operation generation state.

2. The electric generating system using a solar cell according to claim 1, wherein the inverter includes:
    a first inverter switching device;
    a second inverter switching device of which a drain is connected to a source of the first inverter switching device;
    a third inverter switching device of which a drain is connected to a drain of the first inverter switching device; and
    a fourth inverter switching device of which a source is connected to the source of the second inverter switching device and a drain is connected to a source of the third inverter switching device,
    wherein the first and the fourth inverter switching devices are turned on in a period where the voltage of the power system is positive and the second and the third inverter switching devices are turned on in a period where the voltage of the power system is negative.

3. The electric generating system using a solar cell according to claim 2, wherein the control device controls in such a way that at least one inverter switching device between the first and the fourth inverter switching devices performs a switching at a frequency higher than a frequency during: a normal operation if an erroneous operation is generated at an interval where the voltage of the power system is positive.

4. The electric generating system using a solar cell according to claim 2, wherein the control device controls in such a way that at least one inverter switching device between the second and the third inverter switching devices performs a switching at a frequency higher than a frequency during a normal operation if an erroneous operation is generated at an interval where the voltage of the power system is negative.

5. The electric generating system using a solar cell according to claim 1, wherein the compensator determines as a normal operation if the current command value is smaller than the threshold value and determines as an erroneous operation if the current command value is not smaller than the threshold value.

6. The electric generating system using a solar cell according to claim 1, wherein the compensator determines as an erroneous operation if a condition of a below equation 1 is satisfied; and, if the condition of the below equation 1 is not satisfied, determines as a normal operation, $$I_{out}^* \geq \frac{V_{DC} D_u}{n V_{PV} + V_{DC}}$$

wherein the Du is a maximum value of the first reference signal, the n is a winding ratio of a transformer T, the VDC is a DC voltage, the VPV is an output voltage generated in the solar cell and the IOUT* is a current command value.

7. The electric generating system using a solar cell according to claim 1, wherein the inverter control unit includes:
a high frequency signal generating unit for comparing a predetermined second reference signal with the compensation signal to output a high frequency control signal as the compared result;
a commercial frequency signal generating unit for outputting a commercial frequency signal synchronized with a phase of the power system; and
an inverter signal generating unit for generating a plurality of inverter control signals by using the high frequency control signal and the commercial frequency signal.

8. The electric generating system using a solar cell according to claim 7, wherein the compensator includes:
an erroneous operation determining unit for comparing the current command value with the calculated threshold value and for determining whether an erroneous operation is generated or not by using the comparison result; and
a compensation signal generating unit for outputting a maximum value of the second reference signal as the compensation signal if the erroneous operation determining unit determines as a normal operation.

9. The electric generating system using a solar cell according to claim 7, wherein the compensator includes:
an erroneous determining unit for comparing the current command value with the calculated threshold value to determine whether an erroneous operation is generated or not by using the comparison result;
an output constant estimating unit for estimating an output constant with reference to an amount of power to be generated if the erroneous determining unit determines as an erroneous operation;
a compensation coefficient calculating unit for calculating a compensation coefficient based on the output constant; and
a compensation signal generating unit for generating the compensation signal by using the compensation coefficient, the maximum values of the first and the second reference signals and the current command value.

10. The electric generating system using a solar cell according to claim 7, wherein the inverter signal generating unit applies the inverter control signal generated by multiplying the high frequency control signal by the commercial frequency signal to at least one inverter switching device among the plurality of inverter switching devices in an interval where the erroneous operation is generated.

11. The electric generating system using a solar cell according to claim 10, wherein the inverter signal generating unit applies the commercial frequency signal to the remaining switching devices among the plurality of inverter switching devices.

12. The electric generating system using a solar cell according to claim 1, wherein at least one inverter switching device among the plurality of inverter switching devices is constituted of an active switching device.

* * * * *